(12) United States Patent
Dunn

(10) Patent No.: US 12,007,637 B2
(45) Date of Patent: *Jun. 11, 2024

(54) DISPLAY UNIT WITH ORIENTATION BASED OPERATION

(71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/377,401

(22) Filed: Oct. 6, 2023

(65) Prior Publication Data
US 2024/0036379 A1 Feb. 1, 2024

Related U.S. Application Data

(63) Continuation of application No. 17/983,144, filed on Nov. 8, 2022, now Pat. No. 11,815,755, which is a
(Continued)

(51) Int. Cl.
*G02F 1/1333* (2006.01)
*G01C 9/06* (2006.01)
(Continued)

(52) U.S. Cl.
CPC ......... *G02F 1/133382* (2013.01); *G01C 9/06* (2013.01); *G04G 9/0064* (2013.01);
(Continued)

(58) Field of Classification Search
CPC ........ G01C 9/06; G04G 9/0064; G04G 21/02; G09G 3/3406
(Continued)

(56) References Cited

U.S. PATENT DOCUMENTS 4,093,355 A 6/1978 Kaplit et al.
4,593,978 A 6/1986 Mourey et al.
(Continued)

FOREIGN PATENT DOCUMENTS

AU 2010218083 B2 10/2016
AU 2016203550 B2 3/2018
(Continued)

OTHER PUBLICATIONS

Novitsky, T. et al., Design How-To, Driving LEDs versus CCFLs for LCD backlighting, EE Times, Nov. 12, 2007, 6 pages, AspenCore.
(Continued)

*Primary Examiner* — Prabodh M Dharia
(74) *Attorney, Agent, or Firm* — Standley Law Group LLP; Jeffrey S. Standley; Adam J. Smith

(57) ABSTRACT

Display units for digital out of home advertising with orientation monitoring features are disclosed. The units include an electronic display, an orientation detection device, and a controller. The controller receives orientation data from the orientation detection device, determines a baseline orientation of the display unit, and where a subsequently detected orientation is not within a predetermined margin of the baseline orientation, electronically generates an alert.

20 Claims, 5 Drawing Sheets

Related U.S. Application Data continuation of application No. 17/201,933, filed on Mar. 15, 2021, now Pat. No. 11,526,044.

(60) Provisional application No. 63/000,612, filed on Mar. 27, 2020.

(51) Int. Cl.
*G04G 9/00* (2006.01)
*G04G 21/02* (2010.01)
*G09G 3/34* (2006.01)

(52) U.S. Cl.
CPC ............ *G04G 21/02* (2013.01); *G09G 3/3406* (2013.01); *G09G 2320/041* (2013.01); *G09G 2330/021* (2013.01)

(58) Field of Classification Search
USPC ........................ 345/12; 701/300; 361/679.01
See application file for complete search history.

(56) References Cited

U.S. PATENT DOCUMENTS

| | | |
|---|---|---|
| 4,634,225 A | 1/1987 | Haim et al. |
| 4,722,669 A | 2/1988 | Kundert |
| 5,029,982 A | 7/1991 | Nash |
| 5,086,314 A | 2/1992 | Aoki et al. |
| 5,088,806 A | 2/1992 | McCartney et al. |
| 5,162,785 A | 11/1992 | Fagard |
| 5,247,374 A | 9/1993 | Terada |
| 5,285,677 A | 2/1994 | Oehler |
| 5,559,614 A | 9/1996 | Urbish et al. |
| 5,661,374 A | 8/1997 | Cassidy et al. |
| 5,748,269 A | 5/1998 | Harris et al. |
| 5,767,489 A | 6/1998 | Ferrier |
| 5,769,705 A | 6/1998 | O'Callaghan et al. |
| 5,783,909 A | 7/1998 | Hochstein |
| 5,786,801 A | 7/1998 | Ichise |
| 5,808,418 A | 9/1998 | Pitman et al. |
| 5,818,010 A | 10/1998 | McCann |
| 5,952,992 A | 9/1999 | Helms |
| 5,991,153 A | 11/1999 | Heady et al. |
| 6,085,152 A | 7/2000 | Doerfel |
| 6,089,751 A | 7/2000 | Conover et al. |
| 6,144,359 A | 11/2000 | Grave |
| 6,153,985 A | 11/2000 | Grossman |
| 6,157,143 A | 12/2000 | Bigio et al. |
| 6,157,432 A | 12/2000 | Helbing |
| 6,181,070 B1 | 1/2001 | Dunn et al. |
| 6,191,839 B1 | 2/2001 | Briley et al. |
| 6,259,492 B1 | 7/2001 | Imoto et al. |
| 6,292,228 B1 | 9/2001 | Cho |
| 6,297,859 B1 | 10/2001 | George |
| 6,380,853 B1 | 4/2002 | Long et al. |
| 6,388,388 B1 | 5/2002 | Weindorf et al. |
| 6,400,101 B1 | 6/2002 | Biebl et al. |
| 6,417,900 B1 | 7/2002 | Shin et al. |
| 6,496,236 B1 | 12/2002 | Cole et al. |
| 6,509,911 B1 | 1/2003 | Shimotono |
| 6,535,266 B1 | 3/2003 | Nemeth et al. |
| 6,556,258 B1 | 4/2003 | Yoshida et al. |
| 6,628,355 B1 | 9/2003 | Takahara |
| 6,701,143 B1 | 3/2004 | Dukach et al. |
| 6,712,046 B2 | 3/2004 | Nakamichi |
| 6,753,661 B2 | 6/2004 | Muthu et al. |
| 6,753,842 B1 | 6/2004 | Williams et al. |
| 6,762,741 B2 | 7/2004 | Weindorf |
| 6,798,341 B1 | 9/2004 | Eckel et al. |
| 6,809,718 B2 | 10/2004 | Wei et al. |
| 6,812,851 B1 | 11/2004 | Dukach et al. |
| 6,813,375 B2 | 11/2004 | Armato, III et al. |
| 6,839,104 B2 | 1/2005 | Taniguchi et al. |
| 6,850,209 B2 | 2/2005 | Mankins et al. |
| 6,885,412 B2 | 4/2005 | Ohnishi et al. |
| 6,886,942 B2 | 5/2005 | Okada et al. |
| 6,891,135 B2 | 5/2005 | Pala et al. |
| 6,943,768 B2 | 9/2005 | Cavanaugh et al. |
| 6,982,686 B2 | 1/2006 | Miyachi et al. |
| 6,996,460 B1 | 2/2006 | Krahnstoever et al. |
| 7,015,470 B2 | 3/2006 | Faytlin et al. |
| 7,038,186 B2 | 5/2006 | De Brabander et al. |
| 7,064,733 B2 | 6/2006 | Cok et al. |
| 7,083,285 B2 | 8/2006 | Hsu et al. |
| 7,136,076 B2 | 11/2006 | Evanicky et al. |
| 7,174,029 B2 | 2/2007 | Agostinelli et al. |
| 7,176,640 B2 | 2/2007 | Tagawa |
| 7,236,154 B1 | 6/2007 | Kerr et al. |
| 7,307,614 B2 | 12/2007 | Vinn |
| 7,324,080 B1 | 1/2008 | Hu et al. |
| 7,330,002 B2 | 2/2008 | Joung |
| 7,354,159 B2 | 4/2008 | Nakamura et al. |
| 7,447,018 B2 | 11/2008 | Lee et al. |
| 7,474,294 B2 | 1/2009 | Leo et al. |
| 7,480,042 B1 | 1/2009 | Phillips et al. |
| 7,518,600 B2 | 4/2009 | Lee |
| 7,595,785 B2 | 9/2009 | Jang |
| 7,639,220 B2 | 12/2009 | Yoshida et al. |
| 7,659,676 B2 | 2/2010 | Hwang |
| 7,692,621 B2 | 4/2010 | Song |
| 7,724,247 B2 | 5/2010 | Yamazaki et al. |
| 7,795,574 B2 | 9/2010 | Kennedy et al. |
| 7,795,821 B2 | 9/2010 | Jun |
| 7,800,706 B2 | 9/2010 | Kim et al. |
| 7,804,477 B2 | 9/2010 | Sawada et al. |
| 7,982,706 B2 | 7/2011 | Ichikawa et al. |
| 8,087,787 B2 | 1/2012 | Medin |
| 8,111,371 B2 | 2/2012 | Suminoe et al. |
| 8,125,163 B2 | 2/2012 | Dunn et al. |
| 8,144,110 B2 | 3/2012 | Huang |
| 8,175,841 B2 | 5/2012 | Ooghe |
| 8,194,031 B2 | 6/2012 | Yao et al. |
| 8,248,203 B2 | 8/2012 | Hanwright et al. |
| 8,319,936 B2 | 11/2012 | Yoshida et al. |
| 8,325,057 B2 | 12/2012 | Salter |
| 8,352,758 B2 | 1/2013 | Atkins et al. |
| 8,508,155 B2 | 8/2013 | Schuch |
| 8,569,910 B2 | 10/2013 | Dunn et al. |
| 8,605,121 B2 | 12/2013 | Chu et al. |
| 8,643,589 B2 | 2/2014 | Wang |
| 8,700,226 B2 | 4/2014 | Schuch et al. |
| 8,797,372 B2 | 8/2014 | Liu |
| 8,810,501 B2 | 8/2014 | Budzelaar et al. |
| 8,823,630 B2 | 9/2014 | Roberts et al. |
| 8,829,815 B2 | 9/2014 | Dunn et al. |
| 8,895,836 B2 | 11/2014 | Amin et al. |
| 8,901,825 B2 | 12/2014 | Reed |
| 8,982,013 B2 | 3/2015 | Sako et al. |
| 8,983,385 B2 | 3/2015 | Macholz |
| 8,988,011 B2 | 3/2015 | Dunn |
| 9,030,129 B2 | 5/2015 | Dunn et al. |
| 9,167,655 B2 | 10/2015 | Dunn et al. |
| 9,286,020 B2 | 3/2016 | Dunn et al. |
| 9,400,192 B1 | 7/2016 | Salser, Jr. et al. |
| 9,448,569 B2 | 9/2016 | Schuch et al. |
| 9,451,060 B1 | 9/2016 | Bowers et al. |
| 9,445,470 B2 | 11/2016 | Wang et al. |
| 9,516,485 B1 | 12/2016 | Bowers et al. |
| 9,536,325 B2 | 1/2017 | Bray et al. |
| 9,622,392 B1 | 4/2017 | Bowers et al. |
| 9,629,287 B2 | 4/2017 | Dunn |
| 9,799,306 B2 | 10/2017 | Dunn et al. |
| 9,835,893 B2 | 12/2017 | Dunn |
| 9,867,253 B2 | 1/2018 | Dunn et al. |
| 9,881,528 B2 | 1/2018 | Dunn |
| 9,924,583 B2 | 3/2018 | Schuch et al. |
| 10,194,562 B2 | 1/2019 | Shelnutt et al. |
| 10,255,884 B2 | 4/2019 | Dunn et al. |
| 10,321,549 B2 | 6/2019 | Schuch et al. |
| 10,409,544 B2 | 9/2019 | Park et al. |
| 10,412,816 B2 | 9/2019 | Schuch et al. |
| 10,440,790 B2 | 10/2019 | Dunn et al. |
| 10,499,516 B2 | 12/2019 | Dunn et al. |
| 10,506,738 B2 | 12/2019 | Dunn |
| 10,578,658 B2 | 3/2020 | Dunn et al. |

(56) References Cited

U.S. PATENT DOCUMENTS

| | | |
|---|---|---|
| 10,586,508 B2 | 3/2020 | Dunn |
| 10,593,255 B2 | 3/2020 | Schuch et al. |
| 10,607,520 B2 | 3/2020 | Schuch et al. |
| 10,660,245 B2 | 5/2020 | Dunn et al. |
| 10,687,446 B2 | 6/2020 | Dunn et al. |
| 10,782,276 B2 | 9/2020 | Dunn et al. |
| 10,795,413 B1 | 10/2020 | Dunn |
| 10,803,783 B2 | 10/2020 | Wang et al. |
| 10,858,886 B2 | 12/2020 | Fasi et al. |
| 10,860,141 B2 | 12/2020 | Wang et al. |
| 10,925,174 B2 | 2/2021 | Dunn et al. |
| 11,016,547 B2 | 5/2021 | Whitehead et al. |
| 11,022,635 B2 | 6/2021 | Dunn et al. |
| 11,132,715 B2 | 9/2021 | Menendez et al. |
| 11,293,908 B2 | 4/2022 | Dunn et al. |
| 11,526,044 B2 | 12/2022 | Dunn |
| 11,656,255 B2 | 5/2023 | Dunn et al. |
| 11,774,428 B2 | 10/2023 | Dunn et al. |
| 2002/0009978 A1 | 1/2002 | Dukach et al. |
| 2002/0020090 A1 | 2/2002 | Sanders |
| 2002/0050974 A1 | 5/2002 | Rai et al. |
| 2002/0065046 A1 | 5/2002 | Mankins et al. |
| 2002/0084891 A1 | 7/2002 | Mankins et al. |
| 2002/0101553 A1 | 8/2002 | Enomoto et al. |
| 2002/0112026 A1 | 8/2002 | Fridman et al. |
| 2002/0126248 A1 | 9/2002 | Yoshida |
| 2002/0154138 A1 | 10/2002 | Wada et al. |
| 2002/0164962 A1 | 11/2002 | Mankins et al. |
| 2002/0167637 A1 | 11/2002 | Burke et al. |
| 2002/0190972 A1 | 12/2002 | Ven de Van |
| 2003/0007109 A1 | 1/2003 | Park |
| 2003/0088832 A1 | 5/2003 | Agostinelli et al. |
| 2003/0122810 A1 | 7/2003 | Tsirkel et al. |
| 2003/0204342 A1 | 10/2003 | Law et al. |
| 2003/0214242 A1 | 11/2003 | Berg-johansen |
| 2003/0230991 A1 | 12/2003 | Muthu et al. |
| 2004/0032382 A1 | 2/2004 | Cok et al. |
| 2004/0036622 A1 | 2/2004 | Dukach et al. |
| 2004/0036697 A1 | 2/2004 | Kim et al. |
| 2004/0036834 A1 | 2/2004 | Ohnishi et al. |
| 2004/0113044 A1 | 6/2004 | Ishiguchi |
| 2004/0165139 A1 | 8/2004 | Anderson et al. |
| 2004/0201547 A1 | 10/2004 | Takayama |
| 2004/0243940 A1 | 12/2004 | Lee et al. |
| 2005/0012734 A1 | 1/2005 | Johnson et al. |
| 2005/0024538 A1 | 2/2005 | Park et al. |
| 2005/0043907 A1 | 2/2005 | Eckel et al. |
| 2005/0049729 A1 | 3/2005 | Culbert et al. |
| 2005/0073518 A1 | 4/2005 | Bontempi |
| 2005/0094391 A1 | 5/2005 | Campbell et al. |
| 2005/0127796 A1 | 6/2005 | Olesen et al. |
| 2005/0140640 A1 | 6/2005 | Oh et al. |
| 2005/0184983 A1 | 8/2005 | Brabander et al. |
| 2005/0231457 A1 | 10/2005 | Yamamoto et al. |
| 2005/0242741 A1 | 11/2005 | Shiota et al. |
| 2006/0007107 A1 | 1/2006 | Ferguson |
| 2006/0022616 A1 | 2/2006 | Furukawa et al. |
| 2006/0038511 A1 | 2/2006 | Tagawa |
| 2006/0049533 A1 | 3/2006 | Kamoshita |
| 2006/0087521 A1 | 4/2006 | Chu et al. |
| 2006/0125773 A1 | 6/2006 | Ichikawa et al. |
| 2006/0130501 A1 | 6/2006 | Singh et al. |
| 2006/0197474 A1 | 9/2006 | Olsen |
| 2006/0197735 A1 | 9/2006 | Vuong et al. |
| 2006/0207730 A1 | 9/2006 | Berman et al. |
| 2006/0214904 A1 | 9/2006 | Kimura et al. |
| 2006/0215044 A1 | 9/2006 | Masuda et al. |
| 2006/0220571 A1 | 10/2006 | Howell et al. |
| 2006/0238531 A1 | 10/2006 | Wang |
| 2006/0244702 A1 | 11/2006 | Yamazaki et al. |
| 2007/0013828 A1 | 1/2007 | Cho et al. |
| 2007/0047808 A1 | 3/2007 | Choe et al. |
| 2007/0152949 A1 | 7/2007 | Sakai |
| 2007/0153117 A1 | 7/2007 | Lin et al. |
| 2007/0171647 A1 | 7/2007 | Artwohl et al. |
| 2007/0173297 A1 | 7/2007 | Cho et al. |
| 2007/0200513 A1 | 8/2007 | Ha et al. |
| 2007/0222730 A1 | 9/2007 | Kao et al. |
| 2007/0230167 A1 | 10/2007 | McMahon et al. |
| 2007/0242153 A1 | 10/2007 | Tang et al. |
| 2007/0247594 A1 | 10/2007 | Tanaka |
| 2007/0268234 A1 | 11/2007 | Wakabayashi et al. |
| 2007/0268241 A1 | 11/2007 | Nitta et al. |
| 2007/0273624 A1 | 11/2007 | Geelen |
| 2007/0279369 A1 | 12/2007 | Yao et al. |
| 2007/0291198 A1 | 12/2007 | Shen |
| 2007/0297163 A1 | 12/2007 | Kim et al. |
| 2007/0297172 A1 | 12/2007 | Furukawa et al. |
| 2008/0019147 A1 | 1/2008 | Erchak et al. |
| 2008/0055297 A1 | 3/2008 | Park |
| 2008/0074382 A1 | 3/2008 | Lee et al. |
| 2008/0078921 A1 | 4/2008 | Yang et al. |
| 2008/0084166 A1 | 4/2008 | Tsai |
| 2008/0111958 A1 | 5/2008 | Kleverman et al. |
| 2008/0136770 A1 | 6/2008 | Peker et al. |
| 2008/0143187 A1 | 6/2008 | Hoekstra et al. |
| 2008/0151082 A1 | 6/2008 | Chan |
| 2008/0165203 A1 | 7/2008 | Pantfoerder |
| 2008/0170031 A1 | 7/2008 | Kuo |
| 2008/0176345 A1 | 7/2008 | Yu et al. |
| 2008/0185976 A1 | 8/2008 | Dickey et al. |
| 2008/0204375 A1 | 8/2008 | Shin et al. |
| 2008/0218501 A1 | 9/2008 | Diamond |
| 2008/0224892 A1 | 9/2008 | Bogolea et al. |
| 2008/0230497 A1 | 9/2008 | Strickland et al. |
| 2008/0246871 A1 | 10/2008 | Kupper et al. |
| 2008/0259198 A1 | 10/2008 | Chen et al. |
| 2008/0266554 A1 | 10/2008 | Sekine et al. |
| 2008/0278099 A1 | 11/2008 | Bergfors et al. |
| 2008/0278100 A1 | 11/2008 | Hwang |
| 2008/0303918 A1 | 12/2008 | Keithley |
| 2009/0009997 A1 | 1/2009 | Sanfilippo et al. |
| 2009/0014548 A1 | 1/2009 | Criss et al. |
| 2009/0033612 A1 | 2/2009 | Roberts et al. |
| 2009/0079416 A1 | 3/2009 | Vinden et al. |
| 2009/0085859 A1 | 4/2009 | Song |
| 2009/0091634 A1 | 4/2009 | Kennedy et al. |
| 2009/0104989 A1 | 4/2009 | Williams et al. |
| 2009/0109129 A1 | 4/2009 | Cheong et al. |
| 2009/0135167 A1 | 5/2009 | Sakai et al. |
| 2009/0152445 A1 | 6/2009 | Gardner, Jr. |
| 2009/0278766 A1 | 11/2009 | Sako et al. |
| 2009/0284457 A1 | 11/2009 | Botzas et al. |
| 2009/0289968 A1 | 11/2009 | Yoshida |
| 2010/0033413 A1 | 2/2010 | Song et al. |
| 2010/0039366 A1 | 2/2010 | Hardy |
| 2010/0039414 A1 | 2/2010 | Bell |
| 2010/0039440 A1 | 2/2010 | Tanaka et al. |
| 2010/0060861 A1 | 3/2010 | Medin |
| 2010/0066484 A1 | 3/2010 | Hanwright et al. |
| 2010/0177750 A1 | 7/2010 | Essinger et al. |
| 2010/0194725 A1 | 8/2010 | Yoshida et al. |
| 2010/0231602 A1 | 9/2010 | Huang |
| 2010/0237697 A1 | 9/2010 | Dunn et al. |
| 2010/0253660 A1 | 10/2010 | Hashimoto |
| 2010/0309361 A1* | 12/2010 | Fukushima .......... H04N 5/2628 |
| | | 348/E5.022 |
| 2011/0032285 A1 | 2/2011 | Yao et al. |
| 2011/0032489 A1 | 2/2011 | Kimoto et al. |
| 2011/0050738 A1 | 3/2011 | Fujioka et al. |
| 2011/0058326 A1 | 3/2011 | Idems et al. |
| 2011/0074737 A1 | 3/2011 | Hsieh et al. |
| 2011/0074803 A1 | 3/2011 | Kerofsky |
| 2011/0102630 A1 | 5/2011 | Rukes |
| 2011/0148904 A1 | 6/2011 | Kotani |
| 2011/0163691 A1 | 7/2011 | Dunn |
| 2011/0175872 A1 | 7/2011 | Chuang et al. |
| 2011/0193872 A1 | 8/2011 | Biernath et al. |
| 2011/0231676 A1 | 9/2011 | Atkins et al. |
| 2011/0260534 A1 | 10/2011 | Rozman et al. |
| 2011/0264273 A1 | 10/2011 | Grabinger et al. |
| 2011/0279426 A1 | 11/2011 | Imamura et al. |
| 2011/0283199 A1 | 11/2011 | Schuch et al. |
| 2012/0075362 A1 | 3/2012 | Ichioka et al. |

(56) References Cited

U.S. PATENT DOCUMENTS

| | | |
|---|---|---|
| 2012/0081279 A1 | 4/2012 | Greenebaum et al. |
| 2012/0176420 A1 | 7/2012 | Liu |
| 2012/0182278 A1 | 7/2012 | Ballestad |
| 2012/0197459 A1 | 8/2012 | Fukano |
| 2012/0211001 A1 | 8/2012 | Elshafei |
| 2012/0212520 A1 | 8/2012 | Matsui et al. |
| 2012/0252495 A1 | 10/2012 | Moeglein et al. |
| 2012/0268436 A1 | 10/2012 | Chang |
| 2012/0269382 A1 | 10/2012 | Kiyohara et al. |
| 2012/0284547 A1 | 11/2012 | Culbert et al. |
| 2013/0027370 A1 | 1/2013 | Dunn et al. |
| 2013/0070567 A1 | 3/2013 | Marzouq |
| 2013/0098425 A1 | 4/2013 | Amin et al. |
| 2013/0113973 A1 | 5/2013 | Miao |
| 2013/0158730 A1 | 6/2013 | Yasuda et al. |
| 2013/0278868 A1 | 10/2013 | Dunn et al. |
| 2013/0279090 A1* | 10/2013 | Brandt .................. H04N 5/655 361/679.01 |
| 2013/0344794 A1 | 12/2013 | Shaw et al. |
| 2014/0002747 A1 | 1/2014 | Macholz |
| 2014/0132796 A1 | 5/2014 | Prentice et al. |
| 2014/0139116 A1 | 5/2014 | Reed |
| 2014/0184980 A1 | 7/2014 | Onoue |
| 2014/0190240 A1 | 7/2014 | He et al. |
| 2014/0204452 A1 | 7/2014 | Branson |
| 2014/0232709 A1 | 8/2014 | Dunn et al. |
| 2014/0293605 A1 | 10/2014 | Chemel et al. |
| 2014/0365965 A1 | 12/2014 | Bray et al. |
| 2015/0062892 A1 | 3/2015 | Krames et al. |
| 2015/0070337 A1 | 3/2015 | Bell et al. |
| 2015/0310313 A1 | 10/2015 | Murayama et al. |
| 2015/0319882 A1 | 11/2015 | Dunn et al. |
| 2015/0346525 A1 | 12/2015 | Wolf et al. |
| 2015/0348460 A1 | 12/2015 | Cox et al. |
| 2016/0055671 A1* | 2/2016 | Menozzi .................. G06T 7/80 701/300 |
| 2016/0037606 A1 | 4/2016 | Dunn et al. |
| 2016/0162297 A1 | 6/2016 | Shao |
| 2016/0198545 A1 | 7/2016 | Dunn et al. |
| 2016/0293142 A1 | 10/2016 | Bowden et al. |
| 2016/0334811 A1 | 11/2016 | Marten |
| 2016/0335698 A1 | 11/2016 | Jones et al. |
| 2016/0338181 A1 | 11/2016 | Schuch et al. |
| 2016/0338182 A1 | 11/2016 | Schuch et al. |
| 2016/0358530 A1 | 12/2016 | Schuch et al. |
| 2016/0358538 A1 | 12/2016 | Schuch et al. |
| 2017/0060369 A1* | 3/2017 | Goyal .................. F24F 11/30 |
| 2017/0111486 A1 | 4/2017 | Bowers et al. |
| 2017/0111520 A1 | 4/2017 | Bowers et al. |
| 2017/0168295 A1 | 6/2017 | Iwami |
| 2018/0012565 A1 | 1/2018 | Dunn |
| 2018/0040297 A1 | 2/2018 | Dunn et al. |
| 2018/0042134 A1 | 2/2018 | Dunn et al. |
| 2018/0088368 A1 | 3/2018 | Notoshi et al. |
| 2018/0129461 A1* | 5/2018 | Kim-Whitty .......... G06T 11/00 |
| 2018/0130385 A1 | 5/2018 | Qian et al. |
| 2018/0132327 A1 | 5/2018 | Dunn et al. |
| 2018/0203475 A1 | 7/2018 | Van Derven et al. |
| 2018/0206316 A1 | 7/2018 | Schuch et al. |
| 2019/0021189 A1 | 1/2019 | Kim et al. |
| 2019/0116719 A1* | 4/2019 | Fletcher .................. B64D 1/16 |
| 2019/0237045 A1 | 8/2019 | Dunn et al. |
| 2019/0339312 A1 | 11/2019 | Dunn et al. |
| 2019/0383778 A1 | 12/2019 | Dunn et al. |
| 2020/0012116 A1 | 1/2020 | Fuerst et al. |
| 2020/0150162 A1 | 5/2020 | Dunn et al. |
| 2020/0211505 A1 | 7/2020 | Dunn |
| 2020/0294401 A1* | 9/2020 | Kerecsen ............ G05D 1/0287 |
| 2020/0378939 A1 | 12/2020 | Dunn et al. |
| 2020/0390009 A1 | 12/2020 | Whitehead et al. |
| 2021/0034101 A1* | 2/2021 | Yildiz .................. G06F 1/203 |
| 2021/0035494 A1 | 2/2021 | Yildiz et al. |
| 2021/0263082 A1 | 8/2021 | Dunn et al. |
| 2021/0302779 A1 | 9/2021 | Dunn |
| 2022/0121255 A1 | 4/2022 | Wang et al. |
| 2022/0187266 A1 | 6/2022 | Dunn et al. |
| 2022/0295666 A1 | 9/2022 | Dunn et al. |
| 2023/0060966 A1 | 3/2023 | Dunn |

FOREIGN PATENT DOCUMENTS

| | | |
|---|---|---|
| AU | 2016262614 B2 | 1/2019 |
| AU | 2016308187 B2 | 2/2020 |
| CA | 2754371 C | 11/2017 |
| CA | 2849902 C | 2/2019 |
| CA | 2985673 C | 3/2021 |
| CN | 112526806 A | 3/2021 |
| EP | 0313331 B1 | 2/1994 |
| EP | 1686777 A1 | 8/2006 |
| EP | 2299723 A1 | 3/2011 |
| EP | 2401738 A2 | 1/2012 |
| EP | 2769376 A1 | 8/2014 |
| EP | 2577389 B1 | 5/2017 |
| EP | 3295452 A1 | 3/2018 |
| EP | 2401738 B1 | 5/2018 |
| EP | 3338273 A1 | 6/2018 |
| GB | 2369730 A | 5/2002 |
| JP | 3-153212 A | 7/1991 |
| JP | 5-18767 A | 1/1993 |
| JP | 8193727 A | 7/1996 |
| JP | 8-338981 A | 12/1996 |
| JP | 11-160727 A | 6/1999 |
| JP | 2000122575 A | 4/2000 |
| JP | 2004325629 A | 11/2004 |
| JP | 2005-148490 A | 6/2005 |
| JP | 2005265922 A | 9/2005 |
| JP | 2005-338266 A | 12/2005 |
| JP | 2006-106345 A | 4/2006 |
| JP | 2006-145890 A | 6/2006 |
| JP | 2006318733 A | 11/2006 |
| JP | 2007003638 A | 1/2007 |
| JP | 2007322718 A | 12/2007 |
| JP | 2008-34841 A | 2/2008 |
| JP | 2008-83290 A | 4/2008 |
| JP | 2008122695 A | 5/2008 |
| JP | 2009031622 A | 2/2009 |
| JP | 2010-181487 A | 8/2010 |
| JP | 2010-282109 A | 12/2010 |
| JP | 2011-59543 A | 3/2011 |
| JP | 2014-149485 A | 8/2014 |
| JP | 2018-523148 A | 8/2018 |
| JP | 2018-525650 A | 9/2018 |
| KR | 10-2006-0016469 A | 2/2006 |
| KR | 10-0768584 B1 | 10/2007 |
| KR | 10-2008-0000144 A | 1/2008 |
| KR | 10-2008-0013592 A | 2/2008 |
| KR | 10-2008-0086245 A | 9/2008 |
| KR | 10-2009-0014903 A | 2/2009 |
| KR | 10-2010-0019246 A | 2/2010 |
| KR | 10-2011-0125249 A | 11/2011 |
| KR | 10-2014-0054747 A | 5/2014 |
| KR | 10-1759265 B1 | 7/2017 |
| KR | 10-1931733 B1 | 12/2018 |
| KR | 10-2047433 B1 | 11/2019 |
| KR | 10-2130667 B1 | 6/2020 |
| WO | 2008/050402 A1 | 5/2008 |
| WO | 2010/141739 A2 | 12/2010 |
| WO | 2011/052331 A1 | 5/2011 |
| WO | 2011/130461 A2 | 10/2011 |
| WO | 2011/150078 A2 | 12/2011 |
| WO | 2013/044245 A1 | 3/2013 |
| WO | 2016/183576 A1 | 11/2016 |
| WO | 2017/031237 A1 | 2/2017 |
| WO | 2017/210317 A1 | 12/2017 |
| WO | 2018/009917 A1 | 1/2018 |
| WO | 2019/241546 A1 | 12/2019 |
| WO | 2020/081687 A1 | 4/2020 |
| WO | 2022/197617 A1 | 9/2022 |

OTHER PUBLICATIONS

Vogler, A. et al., Photochemistry and Beer, Journal of Chemical Education, Jan. 1982, pp. 25-27, vol. 59, No. 1.

(56) References Cited

OTHER PUBLICATIONS

Zeeff, T.M. et al., Abstract of EMC analysis of 18" LCD Monitor, Electromagnetic Compatibility, IEEE International Symposium, Aug. 21-25, 2000, vol. 1, 1 page.
Lee, X., What is Gamma Correction in Images and Videos?, http://xahlee.info/img/what_is_gamma_correction.html, Feb. 24, 2010, 4 pages.
Hoober, S. et al., Designing Mobile Interfaces, 2012, pp. 519-521, O'Reilly Media.
Outdoorlink, Inc., SmartLink Website User Manual, http://smartlink.outdoorlinkinc.com/docs/SmartLinkWebsiteUserManual.pdf, 2017, 33 pages.
Outdoorlink, Inc., SmartLink One, One Relay, http://smartlinkcontrol.com/billboard/one-relay/, retrieved Apr. 17, 2019, 2007-16, 6 pages.
Outdoorlink, Inc., SmartLink One Out of Home Media Controller, 2016, 1 page.
Rouaissia, C., Adding Proximity Detection to a Standard Analog-Resistive Touchscreen, SID 2012 Digest, 2012, 1564-1566, p. 132.

\* cited by examiner

DISPLAY UNIT WITH ORIENTATION BASED OPERATION

CROSS-REFERENCE TO RELATED APPLICATIONS

This application is a continuation of U.S. application Ser. No. 17/983,144 filed Nov. 8, 2022, which is a continuation of U.S. application Ser. No. 17/201,933 filed Mar. 15, 2021, now U.S. Pat. No. 11,526,044 issued Dec. 13, 2022, which claims the benefit of U.S. provisional patent application Ser. No. 63/000,612 filed Mar. 27, 2020, the disclosures of each of which are hereby incorporated by reference as if fully restated herein.

TECHNICAL FIELD

Exemplary embodiments relate generally to systems and methods for controlling operations of a display unit based on, at least in part, orientation of the display unit.

BACKGROUND AND SUMMARY OF THE INVENTION

Electronic displays have grown in popularity not only for indoor use, but also for outdoor use. One exemplary application, without limitation, is the digital out of home advertising market where the electronic displays are increasingly replacing the use of static posters. The use of electronic displays is advantageous because such electronic displays permit images to be changed quickly as well as permit the use of videos and interactive displays, among other benefits.

Such outdoor electronic displays experience solar loading. Such solar loading may result in significant heat loads to the electronic display and related components which may result in damage if not thermally managed properly. However, such thermal management efforts require the consumption of additional power. Ambient solar conditions also affect image quality. Electronic display brightness sometimes needs adjusted to make an image visible. The direction an electronic display is facing may affect the amount of solar loading or other exposure received by the electronic display, and thus affect the need to provide thermal management and/or brightness levels, for example. What is needed is a display unit which controls operations based on, at least in part, orientation of the display unit.

A display unit which controls operations based on, at least in part, orientation of the display unit is provided. The display unit may comprise a housing for one or more electronic displays. Such electronic displays, and other components of the display unit, may be cooled or otherwise thermally managed using fans, open loops for ambient air, and/or closed loops for circulating gas, for example. The display unit may comprise a controller. The controller may comprise one or more of: an orientation detection device, an accelerometer, a timekeeping device, a location tracking device, a database, and a sensor. The orientation detection device may comprise a magnetometer, though any type of orientation detection device is contemplated. The aforementioned components may be in electronic communication with a processor, which may be local to or remote from such components. The processor may receive readings from such components. From such readings, one or more of: the tilt angle of the unit, the location of the unit, the time of day, and/or the display unit's direction or other orientation may be determined. From such information, the solar angle relative to each electronic display may be determined. The display unit's operations may be adjusted based upon the solar angle. For example, without limitation, a number of predetermined ranges may be provided and the electronic display's brightness and/or speed of the cooling fans may be adjusted to predetermined criteria for each such range.

As another example, without limitation, such information (e.g., the tilt angle of the unit, the location of the unit, the time of day, and/or the display unit's direction or other orientation) may be used to determine whether or not a display unit is installed properly. For example, without limitation, such information may be used to determine approximate deviation from plumb.

Examples of other such sensors include vibration and/or shock sensors. Data from any of the orientation detection device, the accelerometer, the location tracking device, the vibration sensor, the shock sensor, combinations thereof, or the like may be used to detect damage to the display unit. Such damage may be, for example, without limitation, as a result of vandalism, vehicle collision, natural disaster, or the like. Where such possible damage is detected, such as by exceedance of an impact/shock level, the tilt angle and/or orientation may be determined and compared to expected measure to confirm such damage. Alerts may be provided where such possible damage is detected.

As another example, without limitation, such information (e.g., the tilt angle of the unit, the location of the unit, the time of day, and/or the display unit's direction or other orientation) may be used to determine whether or not a door or other access panel of the unit is opened or closed, assuming the sensor is mounted on or otherwise connected to the door or access panel.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
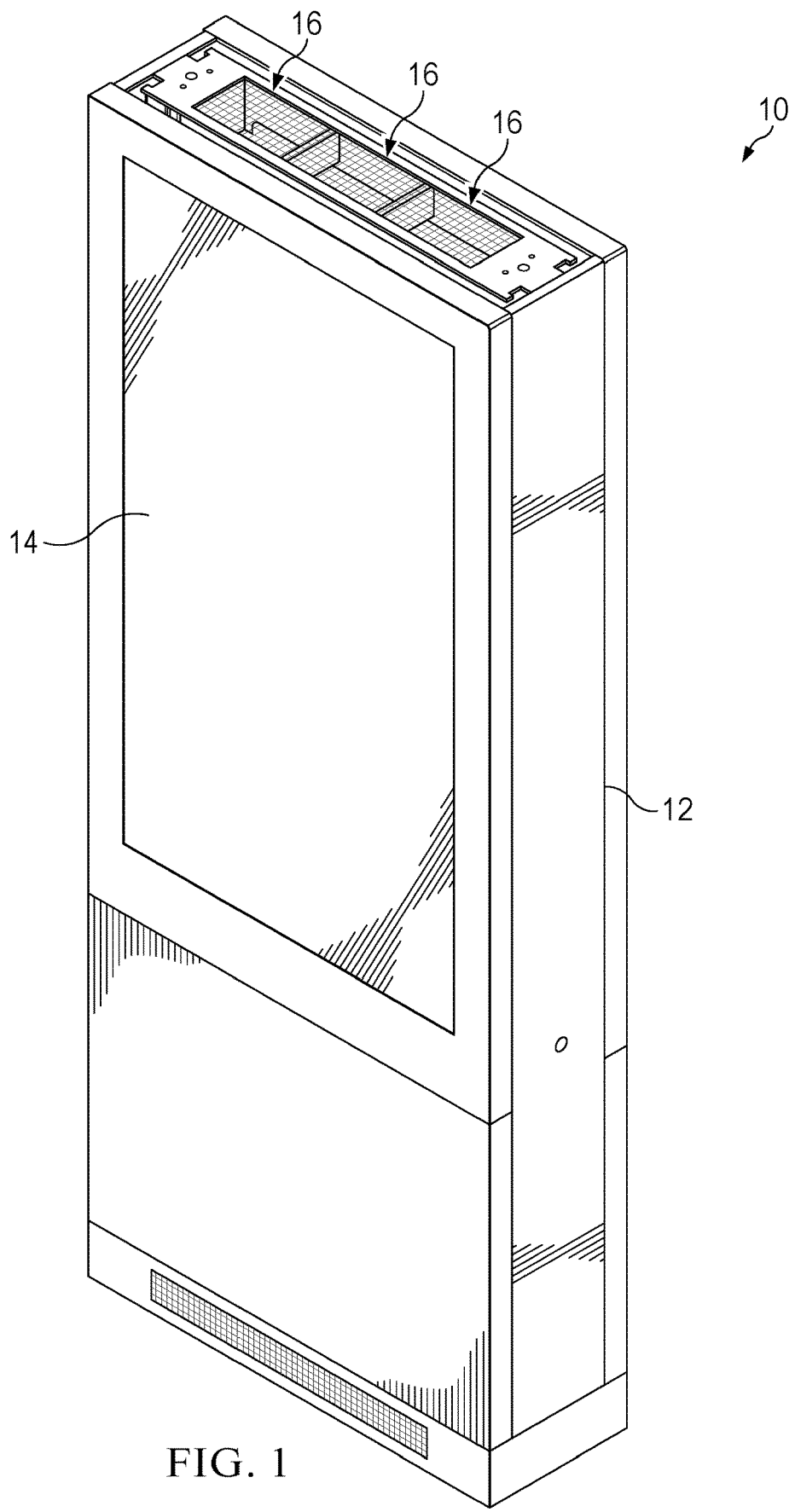
FIG. 1 is a perspective view of an exemplary display unit in accordance with the present invention.

FIG. 1 illustrates a display unit 10. The display unit 10 may comprise a housing 12. One or more electronic displays 14 may be located at the housing 12. The electronic display(s) 14 may be any type, such as, but not limited to, LED, LCD, OLED, rear projection, cathode ray tube, plasma, some combination thereof, or the like. The electronic displays 14 may be directly back lit, edge lit, emissive, passive, transflective, some combination thereof, or the like. The electronic displays 14 may be associated with one or more illumination elements, such as, but not limited to, a backlight, edge light, emissive elements, combinations thereof, or the like. In exemplary embodiments, a first electronic display 14 is positioned at the housing 12 in an opposing arrangement with a second electronic display 14. Any number of electronic displays 14 of any size, shape, location, and/or orientation may be utilized. The same of different types of electronic display 14 may be used in a display unit 10.

The display unit 10 may comprise one or more thermal management systems. The thermal management systems may be those shown and/or described in U.S. Pat. No. 10,499,516 issued Dec. 3, 2019, the disclosures of which are hereby incorporated by reference as if fully restated herein, for example, without limitation. For example, without limitation, one or more apertures 16 may be provided in the housing 12. The apertures 16 may serve as intake points or exhaust points for ambient air. The ambient air may travel through one or more open loop pathways within the housing 12. One or more closed loop pathways for circulating gas may also be located within the housing 12. The open loop pathways and closed loop pathways may thermally interact with one another, such as, but not limited to, at a heat exchanger. An open loop pathway, in exemplary embodiments, may extend along a rear surface of each of the electronic displays 14. A closed loop pathway, in exemplary embodiments, may encircle each of the electronic displays 14. One or more fans may be located along the open loop pathway, the closed loop pathway, some combination thereof, or the like.

Figure 2:
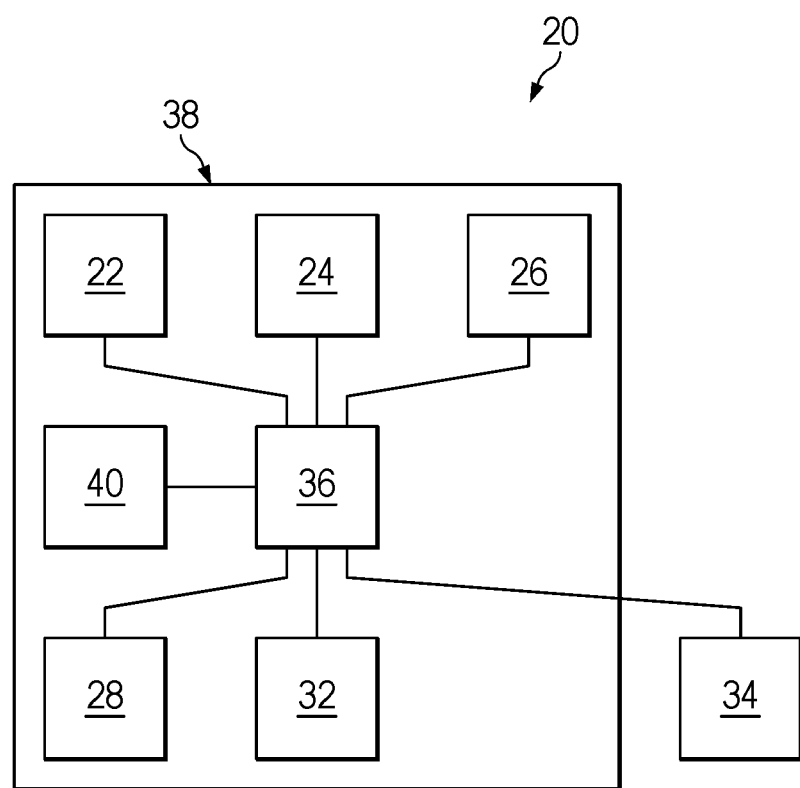
FIG. 2 is a simplified block diagram of an exemplary control unit for the display unit of FIG. 1.

FIG. 2 illustrates a controller 20 for use with the display unit 10. The controller 20 may be located within the housing 12, though any location, including, but not limited, to a remote location, may be utilized. The controller 20 may comprise one or more orientation detection devices 22. The orientation detection device(s) 22 may comprise a magnetometer, accelerometer, motion sensor, location tracking device, compass, gyroscope, some combination thereof, or the like. Other sensors 40 such as, but not limited to, shock and/or vibration sensors may be utilized and placed in electronic communication with the controller 20. The orientation detection device 22 may be configured to determine the direction of the orientation detection device 22, and thus the display unit 10, is facing. Such directional observations may be made in two-dimensions and/or three dimensions. Any kind or type of orientation detection device 22 is contemplated, and combination of such orientation detection devices 22 may be utilized. For example, without limitation, the orientation of the orientation detection device 22 relative to one or more other given components of the display unit 10 may be preprogrammed or known such that the orientation of such given component(s) may be determined from the orientation of the orientation detection device 22.

In exemplary embodiments, the orientation detection device 22 or other device may be located, oriented, calibrated, or otherwise configured to determine the orientation of at least one of the electronic displays 14. For example, without limitation, the orientation detection device 22 may be configured to determine the orientation of each electronic display 14. As another example, without limitation, the orientation detection device 22 may be configured to determine the orientation of the display unit 10 and the orientation of the electronic display(s) 14 may be determined from the known or preprogrammed orientation of the electronic display(s) 14 relative to the orientation detection device 22. As yet another example, without limitation, the orientation detection device 22 may be configured to determine the orientation of a particular one of the electronic displays 14 and the orientation of any remaining electronic display(s) 14 may be determined from the known orientation of the remaining electronic display(s) 14 relative to the orientation detection device 22.

The controller 20 may comprise one or more timekeeping device(s) 24, such as, but not limited to, a GPS receiver, a clock, stopwatch, timer, some combination thereof, or the like. The timekeeping device(s) 24 may be configured to track the time of day. The timekeeping device(s) 24 may be configured to, additionally or alternatively, track the date.

The controller 20 may comprise one or more inclinometers 26. The inclinometers 26 may be configured to determine the tilt angle of the display unit 10. In exemplary embodiments, the inclinometers 26 may be located, oriented, calibrated, or otherwise configured to determine the tilt angle of at least one of the electronic displays 14. The orientation detection device 22 in exemplary embodiments, without limitations, may serve as the inclinometers 26, though not required.

The controller 20 may comprise one or more location devices 28. The location devices 28 may be GPS devices, though any type of location tracking or determining device may be utilized. The location devices 28 may be configured to determine the location of the display unit 10.

In exemplary embodiments, the location tracking device of the orientation detection device 22 or otherwise may also serve as the timekeeping device 24. For example, without limitation, a GPS based device may provide location detection as well as time keeping.

The controller 20 may comprise one or more databases 32. The databases 32 may comprise solar position data such as, but not limited to, sunrise times, sunset times, solar intensity, solar path information, solar angle information, some combination thereof, or the like. The solar position information may be location, time, and/or date specific. Alternatively, or additionally, network communication devices may be provided to connect to one or more remotely located databases 32.

The one or more of the orientation detection devices 22, timekeeping devices 24, inclinometers 26, location devices 28, and/or databases 32 may be in electronic communication with one or more processors 36. The processors 36 may be in electronic communication with one or more thermal management components 34. Such thermal management components 34 may comprise one or more fans, illumination devices for the electronic displays 14 (e.g., LEDs), air conditioning devices, heat pumps, thermoelectric coolers, some combination thereof, or the like. The processor(s) 36 may be configured to receive data from such thermal management component(s) 34 such as, but not limited to, fan operation status, fan speed, air flow, temperatures, some combination thereof, or the like.

The various components of the controller 20 may be located within a controller housing 38, or may be located at one or more locations throughout the display unit 10, and/or may be located remote from the display unit 10. In exemplary embodiments, some components of the controller 20 may be located within the controller housing 38 and others may be located elsewhere, such as, but not limited to, remote from the display unit 10. Where at least some components of the controller 20 are remote from the unit 10, communication with the remaining components of the controller 20 and/or other components of the display unit 10 may be made by way of one or more network communication devices. In other exemplary embodiments, certain components of the controller 20 may not be required and instead may be predetermined, such as through user input. By way of a non-limiting example, the location of the display unit 10 may be predetermined, programmed, and/or provided such that the one or more location devices 28 are not required. Communication between any such components of the display unit 10 or remote therefrom may be accomplished by wired and/or wireless connection.

Figure 3:
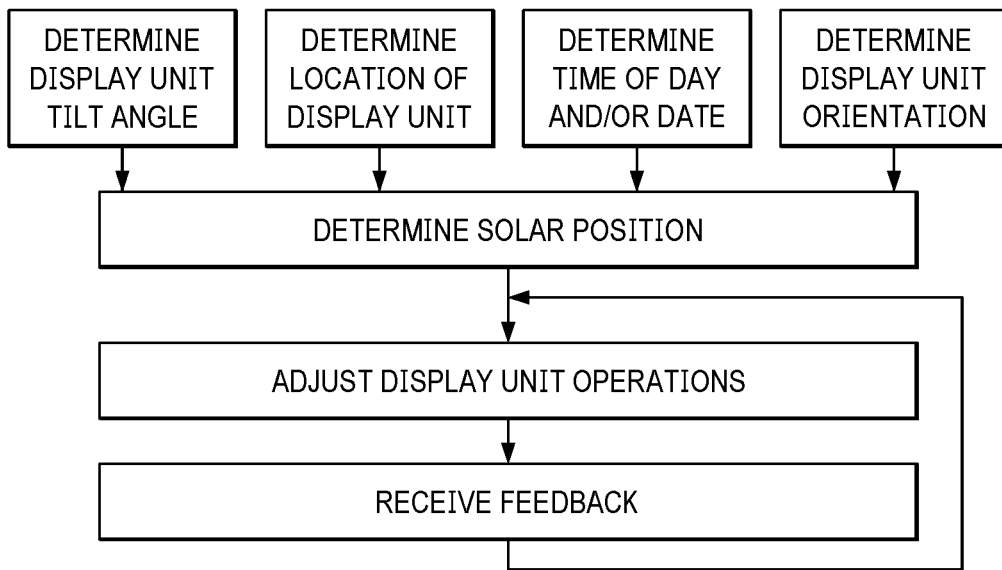
FIG. 3 is a flow chart with exemplary logic for use with the controller of FIG. 2.

FIG. 3 is a flow chart with exemplary logic for use with the controller 20. The tilt angle of the display unit 10 may be determined. In exemplary embodiments, the tilt angle may be determined from data received from the one or more inclinometers 26. Alternatively, or additionally, the tilt angle may be determined by the orientation detection device 22. The location of the display unit 10 may be determined. In exemplary embodiments, the location may be determined from data received from the one or more location devices 28, though the location may alternatively, or additionally, be preprogrammed. The time of day may be determined. In exemplary embodiments, the time of and/or date may be determined from data received from the one or more timekeeping devices 24. The direction the display unit 10 is facing may be determined. In exemplary embodiments, the direction the display unit 10 is facing may be determined from data received from the one or more orientation detection devices 22.

The solar position may be determined. The solar position may be measured by the solar angle. The solar angle may be determined relative to the display unit 10, a particular one of the one or more electronic displays 14, and/or each of the one or more electronic displays 14. The solar angle may be determined relative to other components of the display unit 10. The solar angle may be determined, in exemplary embodiments, by retrieving the solar data from the database 32 indicating the position of the sun for the location, the time of day, and/or the date. Additionally, the tilt angle of the display unit 10 may be used to determine the solar angle relative to the surface of each of the one or more electronic displays 14. By way of a non-limiting example, where the sun is located at 45 degrees relative to the horizon, and the display unit 10 and/or the electronic display 14 is located at 5 degrees upward angle relative to the horizon, the solar angle may be determined to be 40 degrees. Additionally, or alternatively, the direction the display unit 10 may be used to determine the solar angle relative to the surface of each of the one or more electronic displays 14. By way of a non-limiting example, where back-to-back electronic displays 14 are utilized, the solar angle for a first one of electronic displays 14, which faces the sun, may be 20 degrees, while the solar angle for a second one of the electronic displays 14 may be zero and/or a negative, which faces away from the sun.

The determination of the solar angle may be used to adjust operations of the display unit 10. For example, without limitation, where the solar angle is likely to result in greater sun exposure and/or solar loading, the controller 20 may be configured to increase fan speed, increase brightness of the electronic displays 14, some combination thereof, or the like. This may improve cooling and/or image quality. Where, for example, without limitation, the solar angle is likely to result in reduced sun exposure and/or solar loading, the controller 20 may be configured to decrease fan speed, decrease brightness of the electronic display 14, some combination thereof, or the like. This may decrease power consumption.

Such determinations and alternations to display operations may be done based solely on solar angle or in conjunction with other data measures such as, but not limited to, ambient weather conditions, ambient lighting conditions, combinations thereof, or the like. For example, without limitation, weights may be applied to each factor and/or certain factors may be prioritized.

The solar angle may be measured relative to the horizon, a particular cardinal direction (e.g., north, south, east, or west), zenith, some combination thereof, or the like. The solar angle calculated may comprise the attitude, elevation, azimuth, zenith, some combination thereof, or the like. Solar angle may be measured using known or yet to be developed techniques.

Feedback may be received and operations of the display unit 10 may be further adjusted as needed. For example, without limitation, temperature readings may be taken from the thermal management components 34 to ensure temperatures are within predetermined ranges and fan speed may be increased or decreased accordingly. As another example, without limitation, illumination readings of illumination elements for the electronic displays 14 may be taken from the thermal management components 34 to ensure the electronic displays 14 are illuminated properly and illumination may be increased or decreased to meet predetermined criteria.

Figure 4:
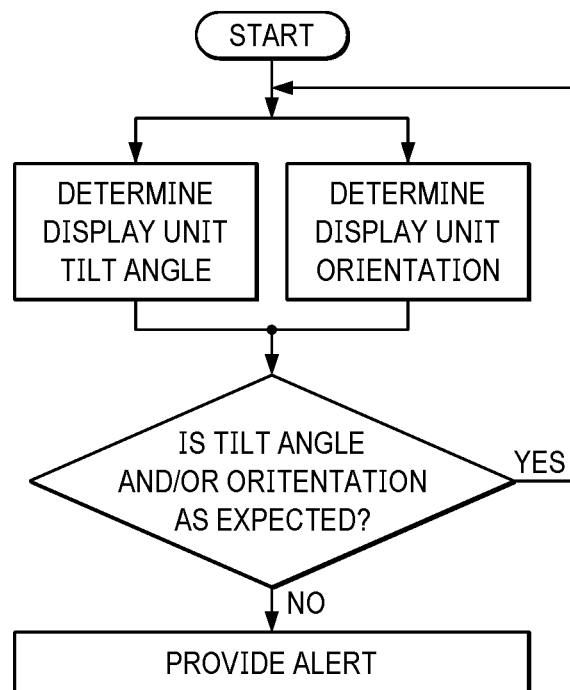
FIG. 4 is a flow chart with other exemplary logic for use with the controller of FIG. 2.

FIG. 4 illustrates other exemplary logic for the controller 20. Display unit 10 tilt readings from the inclinometer(s) 26 and/or orientation readings from the orientation detection device(s) 22 may be used to determine whether or not a display unit is installed properly. For example, without limitation, such information may be used to determine approximate deviation of the display unit 10 or components thereof from plumb or other predetermined design measure.

Data from the orientation detection device 22, the inclinometer(s) 26, and/or the other sensors 40 may be used to detect damage to the display unit 10. Such damage may be, for example, without limitation, as a result of vandalism, vehicle collision, natural disaster, or the like. For example, without limitation, certain readings from the other sensors 40, such as, but not limited to, shock and/or vibration sensors, may indicate damage to the unit 10. Following detection of such possible damage and/or as part of routine assessment, data from the orientation detection device 22 may be used to remotely confirm and/or assess the extent of such possible damage. In exemplary embodiments, where readings from the other sensors 40 indicate damage to the unit 10, data from the orientation detection device 22 may be automatically retrieved to confirm and/or assess the extent of such possible damage. For example, without limitation, if the tilt angle and/or orientation deviates from an expected parameter by more than a threshold, the existence of damage may be considered confirmed. The expected parameter may be a design parameter, last reading, a predetermined threshold, combinations thereof, or the like. If a finding of damage is confirmed, an electronic notification and/or data regarding the same may be sent to one or more remote devices.

Figure 5:
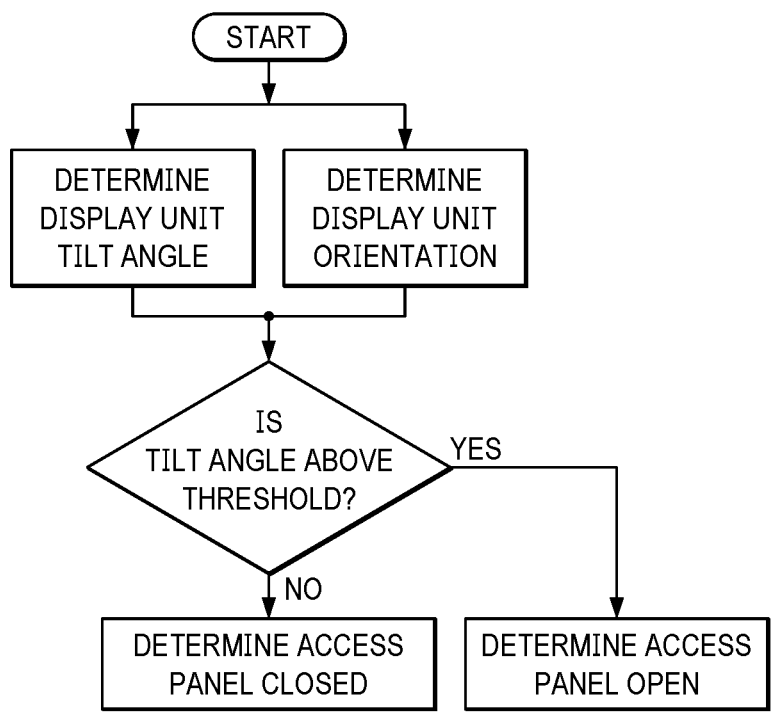
FIG. 5 is a flow chart with other exemplary logic for use with the controller of FIG. 2.

FIG. 5 illustrates other exemplary logic for the controller 20. Some or all of the orientation detection device 22 may be positioned on a particular part of the display assembly 10 to determine the position of the particular part of the display assembly 10 relative to a remaining or other portion of the display assembly 10. For example, without limitation, some or all of the orientation detection device(s) 22 may be placed in one or more access panels (e.g., door), side assemblies, or other framework comprising the electronic display 14, combinations thereof or the like, and may be used to determine whether or not such portion of the display unit 10 is in an opened or closed position. For example, such portions may be moveable relative to a frame, the housing 12, installation mount, or other structure which may be, directly or indirectly, installed at or otherwise connected to a ground surface, sidewalk, building, wall, vehicle roof, combinations thereof, or the like. In this way, the opened or closed nature of such portions may be determined relative to such a frame, housing 12, installation mount, or other structure. In exemplary embodiments, angles or orientations beyond a predetermined threshold (e.g., 10 degrees) may indicate the portion in an opened position. The predetermined threshold may be set relative to a fixed point (e.g., horizontal or vertical), or to an expected threshold (e.g., 0 degrees, 45 degrees, 90 degrees, etc.).

The display unit 10 may comprise one or more network connection devices. The network connection devices may facilitate connection to one or more intranets, internets, cellular networks, the world wide web, combinations thereof, or the like. With the location and/or time information from the location tracking device and/or the time keeping device as well as network connectivity, the display unit 10 may be configured to retrieve a number or various datapoints. Such datapoints may be received at the controller 20 and may be utilized to alter display operations. For example, without limitation, such datapoints may include near real time environmental conditions (e.g., relative humidity, wind speed/direction, barometric pressure, temperature, precipitation, cloud cover, solar intensity, UV index, sunset/sunrise times, combinations thereof, or the like). The controller 20 may use such data, by itself and/or in combination with the solar angle information, to control one or more thermal management components 34, such as, but not limited to, the fans, illumination devices, combinations thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing devices. The electronic devices may be personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A display unit for fixed installation at a surface to provide digital out of home advertising, said display unit comprising:
   an electronic display;
   an orientation detection device; and
   a controller in electronic communication with said orientation detection device, wherein said controller is configured to:
      receive orientation data from said orientation detection device;
      determine a baseline orientation of said display unit, at least in part from a portion of the orientation data; and
      where a later detected orientation of the display unit, determined, at least in part, from a later received portion of the orientation data, indicates that the display unit is not within a predetermined margin of said baseline orientation, electronically generate an alert.

2. The display unit of claim 1 wherein:
   the orientation data comprises azimuth;
   the baseline orientation comprises a baseline azimuth; and
   the subsequently detected orientation comprises a subsequent azimuth.

3. The display unit of claim 1 wherein:
   the orientation data comprises an elevation;
   the baseline orientation comprises a baseline elevation; and
   the subsequently detected orientation comprises a subsequent elevation.

4. The display unit of claim 3 wherein:
   the display unit comprises a frame and an access panel movably connected to the frame;
   the orientation detection device is positioned for movement with the access panel; and
   the alert comprises an indication that the access panel is in an opened position.

5. The display unit of claim 4 wherein:
   the orientation detection device is mounted to the access panel.

6. The display unit of claim 5 wherein:
   the access panel is positioned rearward of the electronic display.

7. The display unit of claim 3 wherein:
   the display unit comprises a structural framework for fixed installation at said surface;
   the electronic display is part of a side assembly moveably connected to the structural framework;

the orientation detection device is positioned for movement with the side assembly; and
the alert comprises an indication that the side assembly is in an opened position.

8. The display unit of claim 7 wherein:
the side assembly comprises a housing for the electronic display; and
the orientation detection device is mounted to the housing.

9. The display unit of claim 1 wherein:
the orientation data comprises azimuth and elevation;
the baseline orientation comprises a baseline azimuth and a baseline elevation; and
the subsequently detected orientation comprises a subsequent azimuth and a subsequent elevation.

10. The display unit of claim 1 wherein:
the orientation detection device comprises at least one of: a magnetometer, inclinometer, and a gyroscope.

11. The display unit of claim 1 wherein:
the alert comprises an electronic notification; and
said controller is configured to transmit said electronic notification to one or more remote devices.

12. The display unit of claim 1 further comprising:
at least one of a shock sensor and a vibration sensor in electronic communication with said controller, and wherein said controller is further configured to:
receive data from said at least one of said shock sensor and said vibration sensor; and
query the orientation detection device for further orientation data where the data received from said at least one of said shock sensor and said vibration sensor is above a predetermined threshold, wherein said further orientation data is used to derive the subsequently detected orientation.

13. The display unit of claim 12 wherein:
the controller is further configured to only generate the alert where the data received from said at least one of said shock sensor and said vibration sensor is above said predetermined threshold; and
said alert comprises an indication that the display unit is damaged.

14. The display unit of claim 1 wherein:
said controller is further configured to adjust operations of said display unit based, at least in part, on said orientation data.

15. The display unit of claim 14 wherein:
the electronic display comprises a directly backlit liquid crystal type display;
the display unit comprises a thermal management subsystem comprising at least one airflow pathway and one or more fans located along the at least one airflow pathway; and
the operations adjusted by the controller comprise at least one of: adjusting a fan speed of said one or more fans, and adjusting an illumination level of the backlight.

16. A display unit for digital out of home advertising, said display unit comprising:
a structural framework for fixed installation at a surface;
a side assembly comprising an electronic display moveably connected to the structural framework;
an orientation detection device connected to the side assembly for movement therewith; and
a controller in electronic communication with said orientation detection device, wherein said controller comprises software instructions stored at one or more non-transitory electronic storage devices of the controller, which when executed, configure one or more processors of the controller to:
receive orientation data from said orientation detection device;
determine a baseline orientation of said display unit, at least in part from a first received portion of the orientation data received after said fixed installation of said display unit at said surface; and
where a subsequently detected orientation, determined, at least in part, from a second, later received portion of the orientation data while said display unit remains fixedly installed at said surface, indicates a current orientation not within a predetermined margin of the baseline orientation, electronically generate an alert indicating that the side assembly is in an opened positioned.

17. The display unit of claim 16 further comprising:
at least one of a shock sensor and a vibration sensor in electronic communication with said controller, and wherein said controller is further configured to:
receive data from said at least one of said shock sensor and said vibration sensor;
query the orientation detection device for further orientation data where the data received from said at least one of said shock sensor and said vibration sensor is above a predetermined threshold; and
generate a damage alert where the shock data received is above said predetermined threshold and said further orientation data orientation data is not within a second preterminal margin of the baseline orientation.

18. The display unit of claim of claim 17 wherein:
the predetermined margin is relative to horizontal; and
the second predetermined margin is an angular amount in terms of degrees or a mathematical equivalent.

19. A display unit for fixed installation at a surface to provide digital out of home advertising, said display unit comprising:
an electronic display;
an orientation detection device;
at least one of a shock sensor and a vibration sensor; and
a controller in electronic communication with said orientation detection device and said at least one of said shock sensor and said vibration sensor, wherein said controller comprises software instructions stored at one or more non-transitory electronic storage devices of the controller, which when executed, configure one or more processors of the controller to:
receive shock data or vibration data from said at least one of said shock sensor and said vibration sensor;
receive orientation data from said orientation detection device;
determined a baseline orientation of said display unit; and
where said shock data or said vibration data is above a predetermined threshold and a later detected orientation of the display unit, determined from at least a later received portion of said orientation data indicated that the display unit is not within a predetermined margin of the baseline orientation, electronically generate an alert indicating damage to the display unit.

20. The display unit of claim 19 further comprising:
a structural framework; and
a side assembly comprising the electronic display, wherein the side assembly is moveably connected to the structural framework, and wherein the orientation detection device is connected to the side assembly for movement therewith, and wherein said controller is further configured to:

determine a baseline orientation of said display unit; and where a subsequently detected orientation indicates a current orientation closer to horizontal than the baseline orientation by at least a predetermined margin, electronically generate a further alert indicating that the side assembly is in an opened positioned.

* * * * *

UNITED STATES PATENT AND TRADEMARK OFFICE
CERTIFICATE OF CORRECTION

PATENT NO. : 12,007,637 B2
APPLICATION NO. : 18/377401
DATED : June 11, 2024
INVENTOR(S) : Dunn Page 1 of 1

It is certified that error appears in the above-identified patent and that said Letters Patent is hereby corrected as shown below:

In the Claims

In Column 10, Line 53, Claim 19, please delete "determined" and insert -- determine --.

In Column 10, Lines 58-59, Claim 19, please delete "indi-cated" and insert -- indicates --.

Signed and Sealed this
Sixth Day of August, 2024

Katherine Kelly Vidal
*Director of the United States Patent and Trademark Office*